US010163108B1

(12) United States Patent
Bharghavan et al.

(10) Patent No.: US 10,163,108 B1
(45) Date of Patent: Dec. 25, 2018

(54) TRANSPARENTLY RECONSTRUCTING SNIFFED NETWORK TRAFFIC OVER A BACK-END DATA COMMUNICATIONS NETWORK TO RECONSTRUCT PAYMENT CARD TRANSACTIONS FOR GENERATING USER NOTIFICATIONS DURING TRANSACTIONS

(71) Applicant: Ondot Systems, Inc., San Jose, CA (US)

(72) Inventors: Vaduvur Bharghavan, Morgan Hill, CA (US); Jari Malinen, Santa Clara, CA (US); Rahul Paul, Bangalore (IN); Ramachandran Minakshi Sundaram, Bengalore (IN)

(73) Assignee: Ondot Systems, Inc., San Jose, CA (US)

( * ) Notice: Subject to any disclaimer, the term of this patent is extended or adjusted under 35 U.S.C. 154(b) by 397 days.

(21) Appl. No.: 13/781,084

(22) Filed: Feb. 28, 2013

(51) Int. Cl.
*G06Q 40/00* (2012.01)
*G06Q 20/42* (2012.01)

(52) U.S. Cl.
CPC .................... *G06Q 20/42* (2013.01)

(58) Field of Classification Search
CPC ......... G06Q 20/40; G06Q 30/06; G06Q 40/02
See application file for complete search history.

(56) References Cited

U.S. PATENT DOCUMENTS

| 5,708,422 | A | 1/1998 | Blonder |
| 5,884,289 | A | 3/1999 | Anderson |
| 5,892,900 | A | 4/1999 | Ginter et al. |
| 5,953,710 | A | 9/1999 | Fleming |
| 6,029,154 | A | 2/2000 | Pettitt |
| 6,122,624 | A | 9/2000 | Tetro |
| 6,343,279 | B1 | 1/2002 | Bissonette |
| 6,422,462 | B1 | 7/2002 | Cohen |
| 6,505,168 | B1 | 1/2003 | Rothman et al. |
| 6,516,056 | B1 | 2/2003 | Justice |
| 7,707,105 | B2 | 4/2010 | O'neil |
| 7,908,216 | B1 | 3/2011 | Davis et al. |
| 7,954,704 | B1 | 6/2011 | Gephart et al. |
| 8,025,220 | B2 | 9/2011 | Blume et al. |
| 8,127,982 | B1 | 3/2012 | Casey |
| 8,131,860 | B1 | 3/2012 | Wong et al. |
| 8,396,888 | B2 | 3/2013 | Cheng et al. |
| 8,413,896 | B2 | 4/2013 | Hogg et al. |
| 8,442,894 | B2 | 5/2013 | Blackhurst et al. |
| 8,540,150 | B2 | 9/2013 | Hogg et al. |

(Continued)

OTHER PUBLICATIONS

"NETRESEC Network Security Blog." NETRESEC Network Security Blog. Web. , Mar. 11, 2011. <http://www.netresec.com/?page=Blog&month=2011-03&post=Sniffing-Tutorial-part-1---Intercepting-Network-Traffic>.*

(Continued)

*Primary Examiner* — Kirsten S Apple
*Assistant Examiner* — Mike Anderson
(74) *Attorney, Agent, or Firm* — Law Office of Dorian Cartwright; Dorian Cartwright (57) ABSTRACT

Embodiments of the present invention provide systems and methods for generating policy-based transaction alerts. In accordance with the systems and methods, an alert generation engine transparently detects ongoing transactions without participating in the transaction path, and generates policy-based alerts.

2 Claims, 9 Drawing Sheets

(56) References Cited

U.S. PATENT DOCUMENTS

| | | |
|---|---|---|
| 8,583,593 B1 | 11/2013 | Achanta |
| 8,706,620 B2 | 4/2014 | Ciurea |
| 8,788,324 B1 | 7/2014 | Shetty |
| 8,818,909 B2 | 8/2014 | Bosworth et al. |
| 93,241,005 | 4/2016 | Kopikare |
| 9,881,298 B2 | 1/2018 | Filtcroft et al. |
| 9,881,299 B2 | 1/2018 | Isaacson et al. |
| 2002/0035539 A1 | 3/2002 | O'Connell |
| 2002/0082995 A1 | 6/2002 | Christie, IV |
| 2002/0120782 A1 | 8/2002 | Dillon et al. |
| 2002/0123938 A1 | 9/2002 | Yu |
| 2002/0152123 A1 | 10/2002 | Giordano et al. |
| 2002/0194141 A1 | 12/2002 | Langensteiner |
| 2002/0198806 A1 | 12/2002 | Blagg |
| 2003/0028481 A1 | 2/2003 | Flitcroft |
| 2004/0039694 A1 | 2/2004 | Dunn |
| 2004/0068653 A1 | 4/2004 | Fascenda |
| 2004/0093268 A1 | 5/2004 | Ramchandani et al. |
| 2004/0128243 A1 | 7/2004 | Kavanagh |
| 2005/0097019 A1 | 5/2005 | Jacobs |
| 2005/0102243 A1 | 5/2005 | Kinsella |
| 2005/0240527 A1 | 10/2005 | Goldman |
| 2005/0268003 A1 | 12/2005 | Wang |
| 2006/0178986 A1 | 8/2006 | Giordano et al. |
| 2007/0039049 A1* | 2/2007 | Kupferman ......... G06F 11/3495 726/22 |
| 2007/0124256 A1* | 5/2007 | Crooks ................. G06Q 20/40 705/80 |
| 2007/0165572 A1 | 7/2007 | Lenzarini |
| 2008/0035724 A1 | 2/2008 | Vawter |
| 2008/0101283 A1 | 5/2008 | Calhoun et al. |
| 2008/0120235 A1 | 5/2008 | Chu |
| 2008/0133336 A1 | 6/2008 | Altman et al. |
| 2008/0147523 A1* | 6/2008 | Mulry ................... G06Q 20/40 705/30 |
| 2008/0228648 A1 | 9/2008 | Kemper |
| 2008/0263402 A1 | 10/2008 | Braysy |
| 2009/0112651 A1* | 4/2009 | Atkinson ............. G06Q 20/027 705/75 |
| 2009/0132424 A1 | 5/2009 | Kendrick et al. |
| 2009/0138968 A1* | 5/2009 | Serber ..................... H04L 63/14 726/22 |
| 2009/0164327 A1 | 6/2009 | Bishop et al. |
| 2009/0164330 A1 | 6/2009 | Bishop et al. |
| 2009/0254462 A1 | 10/2009 | Tomchek et al. |
| 2009/0313147 A1 | 12/2009 | Balasubramanian et al. |
| 2010/0051684 A1 | 3/2010 | Powers |
| 2010/0063903 A1 | 3/2010 | Whipple et al. |
| 2010/0065632 A1 | 3/2010 | Babcock et al. |
| 2010/0106611 A1 | 4/2010 | Paulsen |
| 2010/0114776 A1 | 5/2010 | Weller et al. |
| 2010/0153224 A1 | 6/2010 | Livnat |
| 2010/0274720 A1 | 10/2010 | Carlson |
| 2010/0325047 A1 | 12/2010 | Carlson et al. |
| 2011/0066504 A1 | 3/2011 | Chatow et al. |
| 2011/0137881 A1 | 6/2011 | Cheng et al. |
| 2011/0164509 A1 | 7/2011 | Wengrovitz |
| 2011/0231555 A1 | 9/2011 | Ebrahimi et al. |
| 2011/0238564 A1* | 9/2011 | Lim .................. G06Q 20/3223 705/38 |
| 2011/0251892 A1 | 10/2011 | Laracey |
| 2012/0029999 A1 | 2/2012 | Hogg et al. |
| 2012/0030109 A1 | 2/2012 | Dooley Maley |
| 2012/0036013 A1 | 2/2012 | Neuhaus |
| 2012/0059758 A1 | 3/2012 | Carlson |
| 2012/0072347 A1 | 3/2012 | Conway |
| 2012/0095918 A1* | 4/2012 | Jurss ..................... G06Q 20/40 705/44 |
| 2012/0143730 A1 | 6/2012 | Ansari et al. |
| 2012/0197708 A1 | 8/2012 | Mullen et al. |
| 2012/0197802 A1 | 8/2012 | Smith |
| 2012/0225639 A1 | 9/2012 | Gazdzinski |
| 2012/0233593 A1 | 9/2012 | Sahoo et al. |
| 2012/0271697 A1 | 10/2012 | Gilman |
| 2012/0303525 A1 | 11/2012 | Sahadevan |
| 2013/0138516 A1 | 5/2013 | White |
| 2013/0159121 A1 | 6/2013 | May et al. |
| 2013/0254106 A1 | 9/2013 | Webber et al. |
| 2013/0282593 A1* | 10/2013 | Merz .................. G06Q 30/0601 705/303 |
| 2013/0290121 A1 | 10/2013 | Simakov et al. |
| 2013/0332361 A1 | 12/2013 | Ciurea |
| 2013/0332362 A1 | 12/2013 | Ciurea |
| 2013/0346294 A1 | 12/2013 | Faith |
| 2014/0040135 A1 | 2/2014 | Ovick et al. |
| 2014/0095947 A1 | 4/2014 | Mozak |
| 2014/0144979 A1 | 5/2014 | Lyman et al. |
| 2014/0258119 A1 | 9/2014 | Canis |
| 2014/0304055 A1 | 10/2014 | Faith |
| 2014/0358769 A1 | 12/2014 | Howe et al. |
| 2014/0359052 A1 | 12/2014 | Joachimpillai et al. |
| 2015/0242949 A1 | 8/2015 | Phillips, IV |
| 2015/0278809 A1 | 10/2015 | Deoliveria et al. |

OTHER PUBLICATIONS

"NETRESEC Network Security Blog." NETRESEC Network Security Blog. Web., Mar. 11, 2011. <http://www.netresec.com/?page=Blog&month=2011-03&post=Sniffing-Tutorial-part-1-Intercepting-Network-Traffio.*

"NETRESEC Network Security Blog." NETRESEC Network Security Blog. Web., Mar. 11, 2011.

* cited by examiner

```
ISO 8583 TX REQUEST MESSAGE
0100703E050028C080001647318901025637821800000
00000000000000770091713010610010106021xxxxxxxxx
xxxxxxxxxxxxxxxxxxxxxxxxxxxxx00000000000000001400
005500    1001    360
```

ISO 8583 TX RESPONSE MESSAGE
0110703E050028C08000164731890102563782180000000
000000000000077009171301061001010602 1xxxxxxxxxxx
xxxxxxxxxxxxxxxxxxxxxxxxx000000000000000001400005
500      1001      360

TRANSPARENTLY RECONSTRUCTING SNIFFED NETWORK TRAFFIC OVER A BACK-END DATA COMMUNICATIONS NETWORK TO RECONSTRUCT PAYMENT CARD TRANSACTIONS FOR GENERATING USER NOTIFICATIONS DURING TRANSACTIONS

FIELD

Embodiments of the invention relate generally to payment systems. More particularly embodiments of the invention relate to systems and methods for generating transaction alerts.

BACKGROUND

Payment cards allow card holders to make financial transactions without exchanging cash. A payment card is typically tied to an account, with an associated spending limit that is secured either by card holder funds or by credit from a card-issuing financial institution. In a typical payment card transaction, a card holder presents the payment card information to a merchant (via a card reader or online), who then initiates a transaction authorization via the merchant's financial institution (i.e. acquirer processor) to the card holder's financial institution (i.e. issuer processor). The card holder's financial institution authorizes the transaction subject to checks, e.g. validation checks, fraud checks, etc., and funds availability. The transaction authorization allows the exchange of goods/services between the merchant and the card holder to proceed, with the reconciliation and actual transfer of funds happening either concurrently, or more often, at a later time. Card networks allow different acquirer and issuer processors to communicate with each other in "open loop" communications, while the acquirer and issuer processor are typically either the same or tied to each other via peer relationships in "closed loop" communications.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

Embodiments of the present invention provide systems and methods for generating policy-based transaction alerts. Embodiments of the present invention provide a new paradigm for transaction alert generation. In this paradigm, an alert generation engine transparently detects ongoing transactions without participating in the transaction path, and generates policy-based alerts.

In one embodiment of the invention, an alert generation engine operates on copies of transaction messages as they traverse the payment network. The transaction processing entities, i.e. the acquirer processor, card network, and the issuer processor, are unaware of the presence of the alert engine, and do not participate in the process of transaction alert generation.

Further embodiments enable an alert engine to operate on copies of the transaction messages as they traverse between the issuer processor and the card holder's financial institution.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention are directed toward systems and methods for policy-based alert generation. Some embodiments make the following assumptions: (i) the entities of a payment card network communicate using a data network and are connected by means of a combination of data network elements which may include, but are not limited to, network-layer routers and link-layer switches; (ii) the issuer processor may further communicate with the card holder's financial institution in order to determine whether to authorize a transaction, and this communication also takes place using a data network; (iii) an alert generation engine is connected to the same data network by means of direct communication links to one of the data network elements or by establishing a network communication path to one of the data network elements; and (iv) one or more data network elements have the ability to make a copy of a message traversing through the element and forward the copy of the message to the alert engine. In one embodiment of the invention, an alert engine is directly connected to a "port" in a data network switch to which an issuer processor is connected, and receives copies of the messages destined for, or transmitted by, the issuer processor. However, it is to be understood that embodiments of the invention are not limited to use of specific data network technologies or communication topologies.

In view of the above-identified assumptions, embodiments of the invention are designed to enable an alert engine to transparently receive copies of transaction messages as they traverse the data network between the entities of the payment network, for example between the card network and the issuer processor. Examples of such transaction messages include transaction (pre-)authorization request, transaction (pre-)authorization response, advice, reversal, chargeback, etc. The above list is illustrative and is not intended to be limiting. Once an alert engine receives copies of one or more messages, it reconstructs the transaction data independent of the payment card network, and applies policies on the transaction data in order to generate alerts.

In some embodiments, an alert engine is connected directly to the same data network switch to which the issuer processor is connected.

In some embodiments, an alert engine has a communication channel that spans multiple physical or virtual communication links with the data network switch to which the issuer processor is connected.

In some embodiments, an alert engine has physical or virtual communication channels with multiple data network switching elements to which the issuer processor is connected.

In some embodiments, multiple alert engines collectively have connectivity to the data network elements to which the issuer processor is connected.

In some embodiments, one or more alert engines may be physically separated from the issuer processor and from one another, and communicate over an internetwork of data networks.

In some embodiments, multiple alert engines may receive copies of transaction and response messages, and forward them based on certain criteria to one of the alert engines for reconstruction of the transaction data.

When an alert engine receives copies of the transaction messages, it correlates the messages of a transaction. For example, request and response messages that correspond to a transaction are correlated based on certain criteria, such as the card number and additional fields in the transaction request and response messages, depending on the card network standard and other correlation parameters that can be pre-defined or be extensible dynamically.

In subsequent text, the correlation examples are illustrated by describing transaction request and response. However, correlation may happen between any pair or subset of messages, including but not limited to, request, response, advice, reversal, chargeback, settlement, etc.

Figure 6:
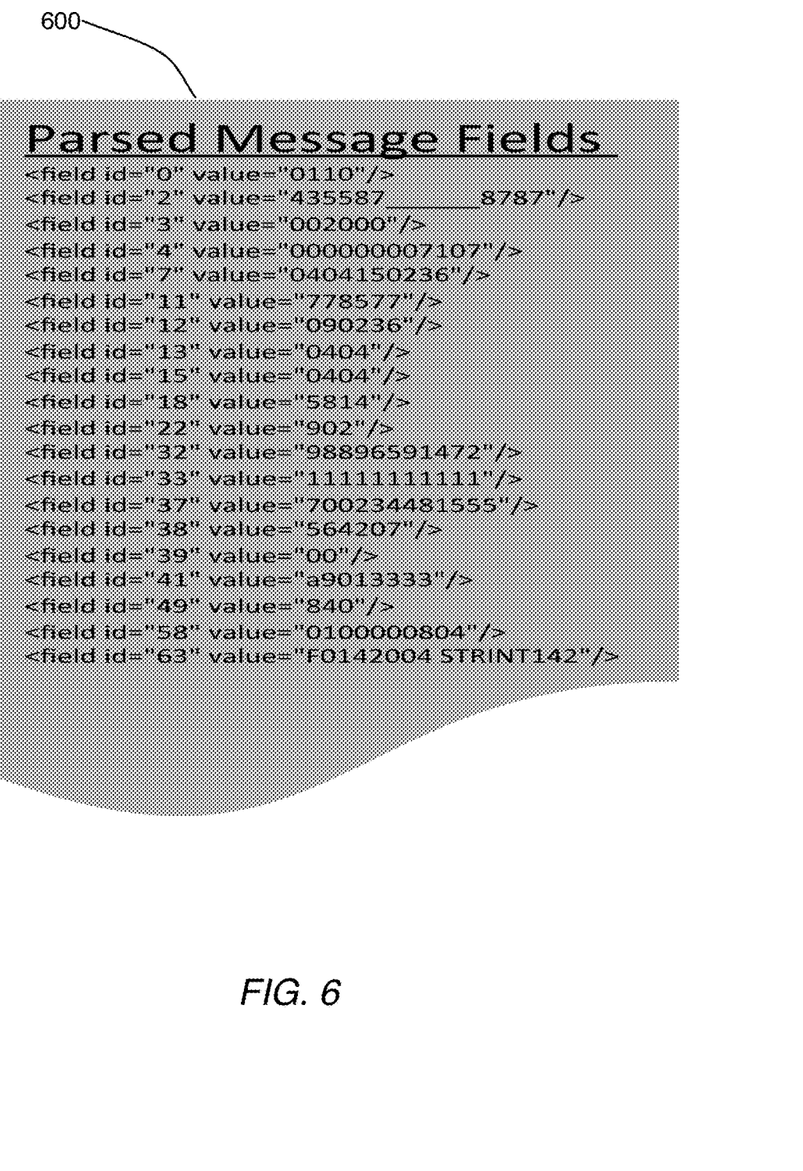
FIG. 6 shows an example of the parsed message fields that can be extracted from request and response packets, in accordance with one embodiment of the invention.

The alert engine 207 parses the messages in order to reconstruct the transaction data, sometimes including but not restricted to, the card number, account number, merchant identifier, merchant type, merchant name, merchant location, transaction amount, transaction type, and transaction status. FIG. 6 shows an example 600 of the parsed message fields that can be extracted from request and response packets.

Embodiments of the invention may generate alerts based on a variety of policies. It is not necessary or sufficient that specific messages in a transaction message sequence are received for an alert to be generated. Further, it is not necessary or sufficient for a transaction to be completed for an alert to be generated.

In some embodiments, an alert may be generated based on the reception of a transaction request message.

In some embodiments, an alert may be generated based on the reception of a transaction request and response message.

In some embodiments, an alert may be generated based on the reception of a transaction request, response, and advice message.

In some embodiments, an alert may be generated based on the reception of a transaction request, response, and reversal message.

The examples above should be construed as illustrative and not limiting.

Embodiments of the invention may generate alerts based on a variety of policies. Examples of such policies include, but are not restricted to, the following:

Generate an alert if the transaction status is included in, or excluded from, a set of transaction status criteria.

Generate an alert if the transaction amount exceeds a threshold value.

Generate an alert if the transaction type is included in, or excluded from, a set of transaction type criteria.

Generate an alert if the merchant type is included in, or excluded from, a set of merchant type criteria.

Generate an alert if the merchant identifier is included in, or excluded from, a set of merchant identifier list.

Generate an alert if the merchant location is included in, or excluded from, a region or a set of regions provided by policy.

Generate an alert if the merchant location is not correlated with the card holder's location.

Generate an alert if any among a set of matching criteria, as exemplified above, match in an alert policy.

Generate an alert if all matching criteria in a set, as exemplified above, match in an alert policy.

Embodiments of the invention may present a variety of information in the alerts, based on policy.

In some embodiments, the transaction data may be partially or fully presented. The partial messages may present fields that are determined by policy, either statically or dynamically.

In some embodiments, additional data such as the location of the card holder may be presented.

In some embodiments, no information about the transaction itself may be presented. Instead, only the notification of some event, not necessarily correlated with the transaction, may be indicated. The recipient or delegate of the recipient of the notification can then retrieve the information by initiating a separate communication.

In some embodiments, no alert notification may be directly generated to the user. Instead, a proxy process on behalf of the user may periodically query the alert engine to receive any transaction updates.

One benefit is to generate transaction alerts immediately upon the receipt of one or more transaction messages, concurrent with the payment card authorization. Alerts may be generated even before the transaction is completed.

Another benefit is to use all the information available in the transaction request and response messages, represented in transaction protocol specifications.

Another benefit is to generate transaction alerts without requiring any interaction with any entity in the payment card network.

Unlike alert engines that use application programming interfaces to interact with entities in the payment card network or the card holder's financial institution to receive transaction updates, embodiments of the invention do not require explicit communication with any entity in the payment card network or the card holder's financial institution.

Unlike alert engines that use application programming interfaces to interact with entities in the payment card network or the card holder's financial institution to receive transaction updates, embodiments of the invention can immediately generate alerts independent of delays in communication delays with the application programming interface.

Figure 2:
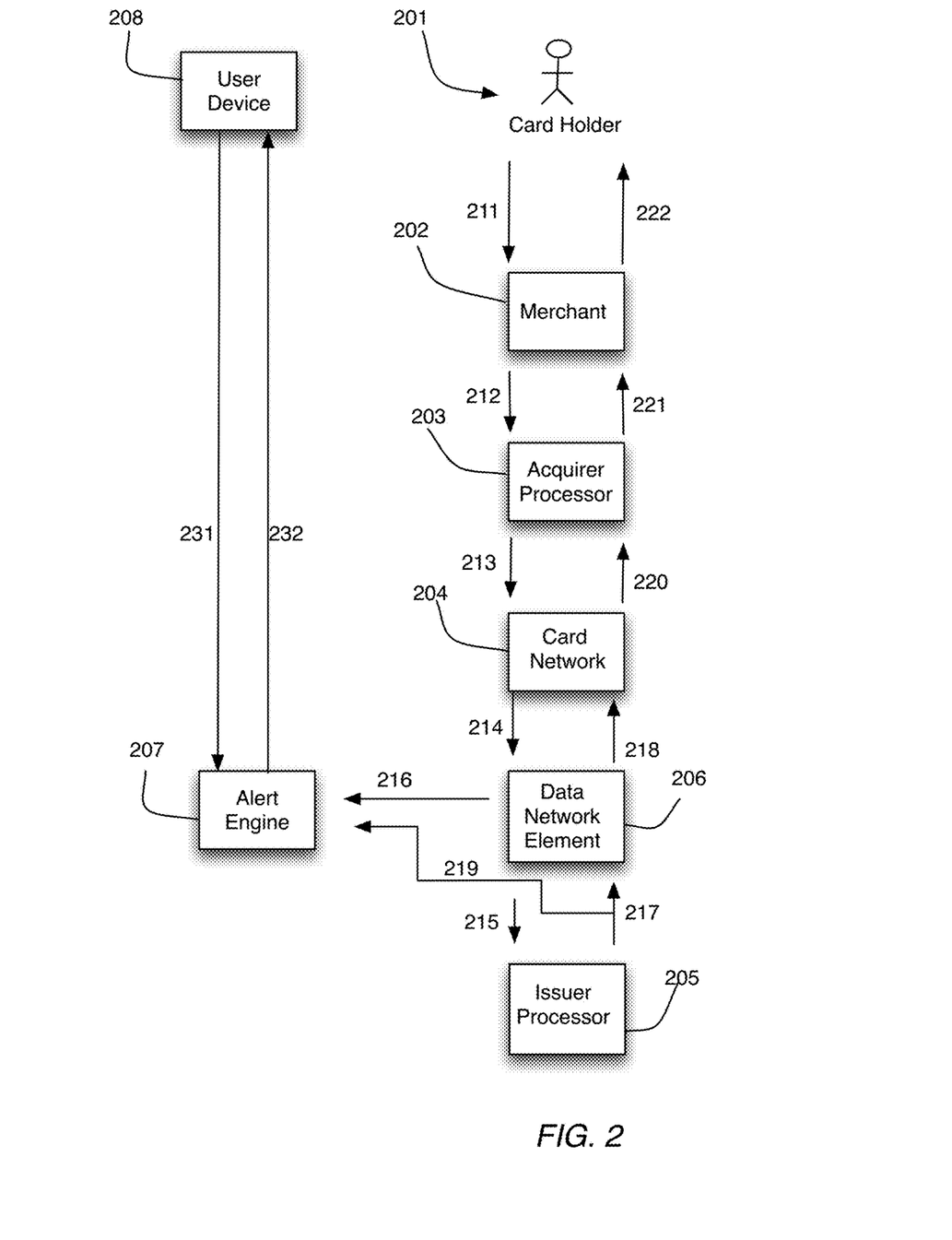
FIG. 2 is a diagram illustrating the injection of an alert generation engine, in accordance with an embodiment of the invention.

Embodiments of the invention may be operable to deliver an alert to the card holder in "real time", i.e. within a time delay that is bounded by the communication latency of one round trip time (231, 232) between the Alert Engine (207) and the User Device (208), as shown in FIG. 2.

Unlike alert engines that use application programming interfaces to interact with entities in the payment card network or the card holder's financial institution to receive transaction updates, embodiments of the invention can use all the information available in the transaction request and response messages, independent of the information contained in the application programming interface.

Unlike alert engines that use application programming interfaces to interact with entities in the payment card network or the card holder's financial institution to receive transaction updates, embodiments of the invention enable an alert engine to operate independently of the payment card network. In the event of failure of the alert engine, the payment card network is unaware, and continues its operation unmodified.

Figure 1:
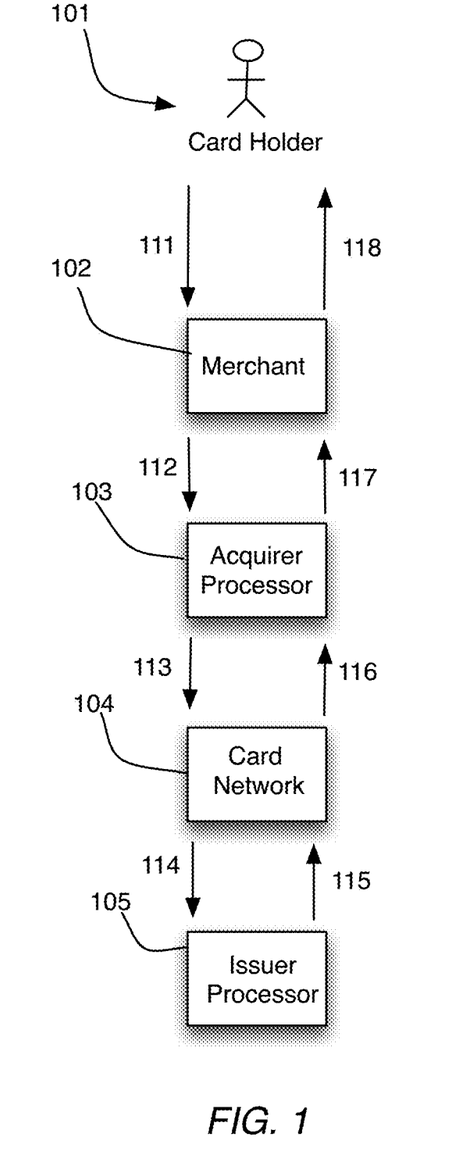
FIG. 1 is a diagram illustrating the existing method for payment card authorization.

FIG. 1 illustrates an open loop transaction processing system. There are at least five entities involved in such a transaction processing system: a card-holder 101 who presents the payment card credentials to make a purchase; a merchant 102 who accepts the payment card transaction in exchange of goods; a merchant or acquiring processor 103 that processes the payment transaction on behalf of the merchant; a card network 104 that connects the acquiring and issuing processors and validates the integrity of the transaction; and an issuer processor 105 that authorizes the transaction on behalf of the card-holder. Typically, the acquirer processor 103 generates the transaction authorization request and the issuer processor 105 authorizes or denies the transaction authorization request in its response.

There are typically, but not always, three phases in a payment card transaction: authorization, clearing, and settlement. These phases are presented as illustration and are not required to all be present for the invention. Authorization is usually a real-time process, where a merchant gets authorization from the issuer processor for the transaction amount. Clearing is either a real-time or offline process, where the merchant requests the actual transaction value (which may be lower than the authorization request) and the amounts are appropriately adjusted in the merchant and card holder's accounts. Settlement is an after-the-fact process that involves the actual transfer of funds and allocation of fees to each of the parties involved in facilitating the transaction.

Transaction messages may be received by an alert engine for any or all phases of the transaction. In the description below, we describe the authorization phase for illustrative purposes. One of ordinary skill in the art will recognize that the invention applies for any transaction message or messages in any phase or phases.

In FIG. 1, the authorization message flow occurs as described below.

The card holder 101 presents the payment card credentials to the merchant point of sale, for example by manual entry, or by card swipe in a card reader, or online entry, or a variety of other means. This step is illustrated by the arrow 111.

The merchant 102 initiates an authorization request with the acquirer processor 103 as indicated by arrow 112. The authorization request may use a flavor of the one of the existing standards for payment card processing (such as ISO 8583), or it may use a private application programming interface that is understood by the merchant point of sale and the acquirer processor 103. One of ordinary skill in the art will recognize that the invention is not limited by the choice of standard.

The acquirer processor 103 initiates an authorization message (indicated by arrow 113) using a standard that is understood by the acquirer processor 103 and the card network 104, for example the ISO 8583 standard, which is a x100 or a x200 message type, with the card number, card credentials, merchant information, transaction amount, and other mandatory and optional fields as required by the ISO 8583 standard.

The card network 104 does validity checks on the message, invokes any additional services that the acquirer or issuer have signed up for (such as address validation, pin validation, risk scoring, etc.), and then forwards (as indicated by arrow 114) the authorization message to the issuer processor 105.

The issuer processor 105 does validity checks on the message, invokes value-added services such as risk scoring, card-holder policy checks, etc., and checks if the card holder 101 has adequate funds to satisfy the transaction request. This step may require the issuer processor 105 to check its local databases or to initiate a real-time communication with the card holder's core banking system to get funds availability validation.

The issuer processor 105 responds to the transaction authorization message with a transaction authorization response message containing an approve/deny and a reason code. This step is indicated by the arrow 115 in FIG. 1.

The card network 104 forwards the transaction authorization response message to the acquirer processor 103 as indicated by the arrow 116.

The acquirer processor 103 completes the transaction handshake by sending the transaction authorization response message to the merchant 102 as indicated by the arrow 117.

The merchant 102 presents the response to the card holder 101 as indicated by the arrow 118.

FIG. 1 shows a simple success case, and not the myriad complex use cases involving message loss, retries, timeouts, stand-in processing, etc.

In different flavors of the ISO 8583 protocol, the transaction request message (x100 or x200) contains the information required to determine the characterization of the transaction, including but not restricted to, the card number, transaction type (e.g. in-store, e-commerce, bill pay, mail order, etc.), merchant identifier, merchant type, merchant location, and transaction amount.

In different flavors of the ISO 8583 protocol, the transaction response message (x110 or x210) contains the information required to complete the characterization of the transaction, including but not restricted to, the authorization status, the denial reason (if transaction is denied), the approval and approval amount.

Each transaction message provides some information relating to the transaction. This message may be used individually, or in combination with other messages, for the generation of alerts, described below.

FIG. 2 illustrates transaction alert generation in accordance with one embodiment of the invention.

Referring to FIG. 2, the card holder 201, merchant 202, acquirer processor 203, card network 204, and issuer processor 205 are as described in FIG. 1. One or more data switches 206 provides connectivity between the card network 204 and issuer processor 205. An alert engine 207 is connected to a data switch 206 directly or indirectly. An additional device or collection of devices 208 that may or may not be associated specifically with a user, can be used for setting alert policies and receiving alerts.

A transaction request originates from a card-holder 201 and is sent to merchant 202 as indicated by arrow 211. This causes merchant 202 to initiate a transaction authorization request message towards acquirer processor 203, as indicated by arrow 212. The acquirer processor 203 in turn generates a corresponding message to the card network 204, as indicated by arrow 213. The card network 204 forward the message at 214 to a data network element, which may for example be a Layer 2 networking switch 206. The switch resides between the card network 204 and the issuer processor 205 and effectively functions as a packet sniffer to sniff network packets (TCP/IP packets) between the card network 204 and the issuer processor 205.

Figure 4:
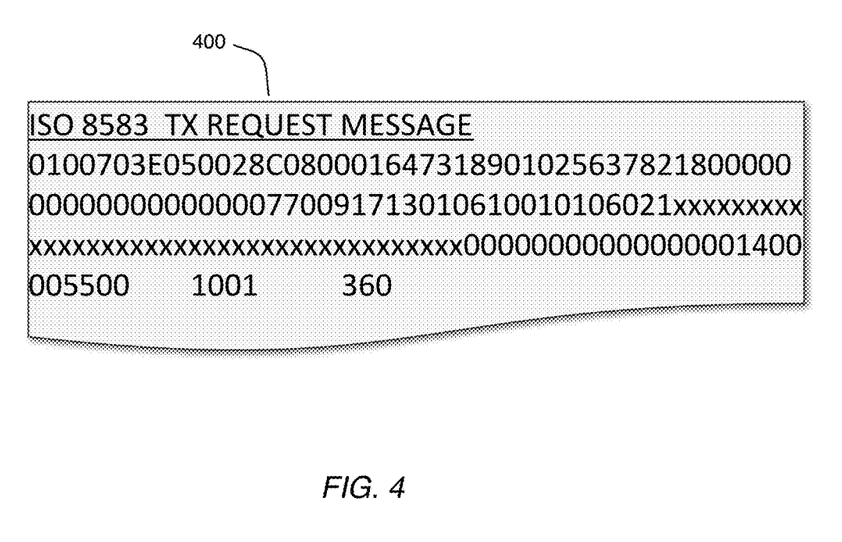
FIG. 4 shows an example of a request message.

The request message traverses the switch 206, which forwards the request to the issuer processor 205 as indicated by arrow 215. The switch 206 also forwards a copy of the message to the alert engine 207 as indicated by the arrow 216. The request message may be in different formats, including Binary, ASCII, and EBCDIC. FIG. 4 shows an example of a request message 400.

The issuer processor 205 responds to the transaction authorization message with a response message containing an approval/denial and reason code. This response message is sent to the switch 206 as indicated by the arrow 217.

Figure 5:
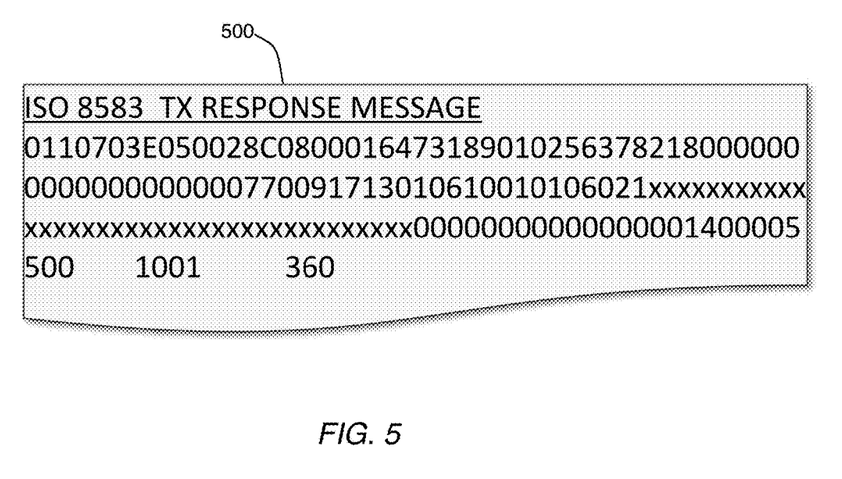
FIG. 5 shows an example of a response message.

The response message traverses the switch or data network element 206, which forwards the response message to the card network 204 as indicate by the arrow 218. A copy of the response message is also sent by the switch 206 to the alert engine 207, as indicated by the arrow 219. The request message may be in binary or ascii. FIG. 5 shows an example of a response message 500.

The card network 204 forwards the transaction authorization response to the acquirer processor 203, as indicated by the arrow 220.

The acquirer processor 203 completes the transaction handshake by responding to the merchant 202, as indicated by the arrow 221.

The merchant 202 presents the response to the card holder 201, as indicated by the arrow 222.

The alert engine 207 may generate alerts based on an individual message or the consolidated information from some or all of the transaction messages.

The alert engine 207 consolidates the information in transaction messages by correlating designated parameters based on the message.

The alert engine 207 applies alert policies on transaction data, possibly correlating it with other stored data, including but not restricted to the outcome of past transactions, user location, merchant credentials, etc., based on alert policies. If an alert is triggered, the alert engine 207 may forward the alert to a designated endpoint, which could be the card holder or delegate's device, or some other configured device A device of set of devices 208 can be used to set alert policies. For example, a device 208 in the form of a smartphone may be provisioned with an alerts application configured to capture alert rules or policies that are set by a cardholder. The alert rules or policy may be transmitted to the alerts engine, e.g. over-the-air. This is indicated by the arrow 231 in FIG. 2. A device or set of devices 208 may be used to receive alerts from the alert engine 207. This is indicated by the arrows 232 in FIG. 2. The devices used for setting policies and the devices used for receiving alerts may be the same, or different.

Figure 3:
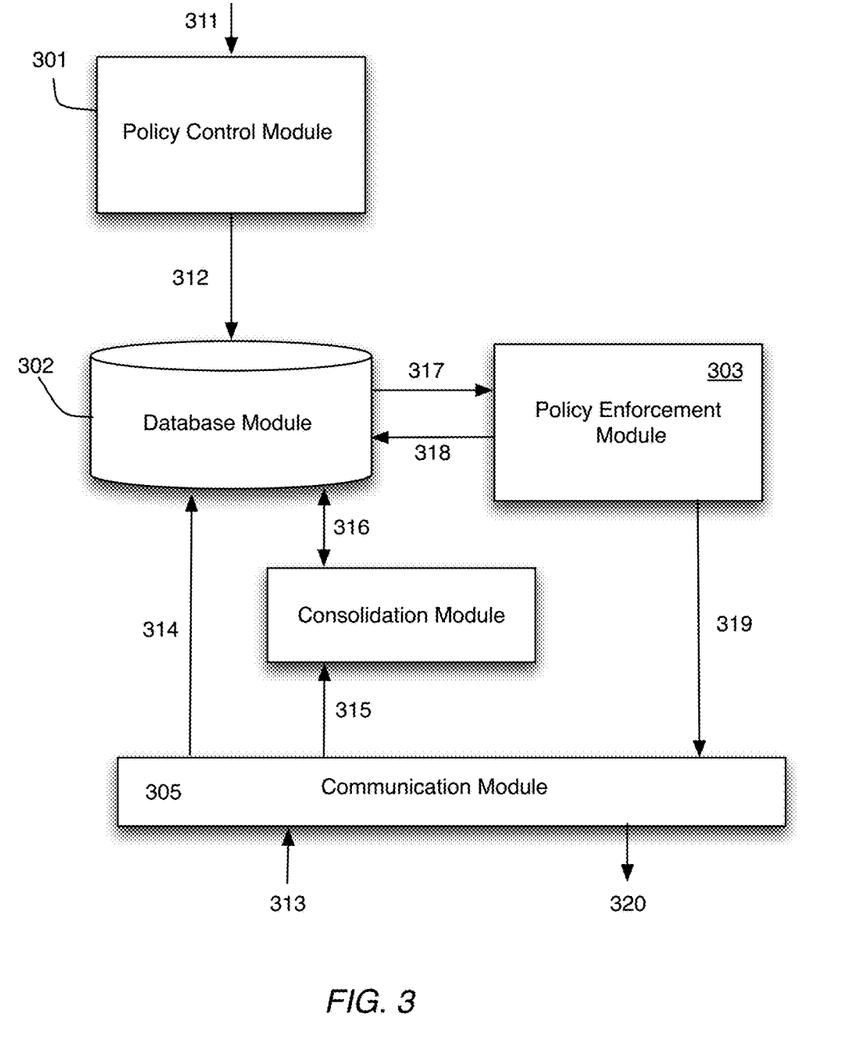
FIG. 3 is a diagram illustrating a system wherein an alert engine transparently receives copies of the transaction messages and applies alert policies independent of the payment network, in according with an embodiment of the invention.

FIG. 3 illustrates components of the alert engine 207, in accordance with one embodiment of the invention. The alert engine 207 comprises a communications module 305 that receives messages from the data switch 206 and sends messages to devices 208, a consolidation module 304 that correlates messages that correspond to a transaction, a database 302 that stores consolidated transaction data or individual messages and alert policies, a policy enforcement module 303 that applies alert policies on consolidated transaction data from multiple messages or individual messages, and a policy control module 301 that interfaces with a variety of devices and individuals, including but not restricted to card holders and their delegates, computers, cell phones, and other configured devices to receive policy updates, and to update the database 302 appropriately. When alerts are generated, they are stored in the database 302 and may be sent out to external devices by means of the communication module 305 which may manage one or more communication interfaces.

A external device, e.g. a device 208 sets control policies and transmits the policies to the alert engine 207. Arrow 311 indicates receipt of the control policies by the policy control module 301. Policy control module 301 sends received control policies to the database 302, as indicated by the arrow 312.

Transaction messages 313 is received by the communications module 305 and forwarded to the database 302 as indicated by the arrow 314. The communications module 305 also sends the transaction messages to the consolidation module 315, as indicated by the arrow 315.

The consolidation module 304 consolidates the transaction data with existing transaction data from the database 302 based on message correlation, and updates the database 302 as indicated by 316.

The policy enforcement module 303 gets messages or consolidated transaction data from the database 302 as indicated by the arrow 317 and applies the alert policies.

The policy enforcement module 303 may generate an alert, indicated by arrow 318, that is stored in the database 302, and also sent to the communication module 305 as is indicated by the arrow 319.

The communication module 305 may send an alert indicated by arrow 320 to an external device.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

Alert engine 207 might include, for example, one or more processors, controllers, control modules, or other processing devices, which are illustrated by the system modules 301-305. Modules might be implemented using a general-purpose or special-purpose processing engine such as, for example, a microprocessor, controller, or other control logic. In the illustrated example, the modules are connected to a bus, although any communication medium can be used to facilitate interaction with other components of computing modules or to communicate externally.

Alert engine 207 might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by processor. Computing module might likewise include a read only memory ("ROM") or other static storage device coupled to bus for storing static information and instructions for processor.

Alert engine 207 might also include one or more various forms of information storage mechanisms 302, which might include, for example, a media drive and a storage unit interface. The media drive might include a drive or other mechanism to support fixed or removable storage media. For example, a hard disk drive, a floppy disk drive, a magnetic tape drive, an optical disk drive, a CD, DVD or Blu-ray drive (R or RW), or other removable or fixed media drive might be provided. Accordingly, storage media might include, for example, a hard disk, a floppy disk, magnetic tape, cartridge, optical disk, a CD, DVD or Blu-ray, or other fixed or removable medium that is read by, written to or accessed by media drive. As these examples illustrate, the storage media can include a computer usable storage medium having stored therein computer software or data.

In alternative embodiments, information storage mechanism 302 might include other similar instrumentalities for allowing computer programs or other instructions or data to be loaded into computing module. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

Alert engine 207 might also include a communications interface 305 such as an Ethernet, network interface card, WiMedia, IEEE 802.XX or other interface), or other communications interface. Data transferred via communications interface might typically be carried on signals, which can be electronic, electromagnetic (which includes optical) or other signals capable of being exchanged by a given communications interface. These signals might be provided to communications interface via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

Figure 7:
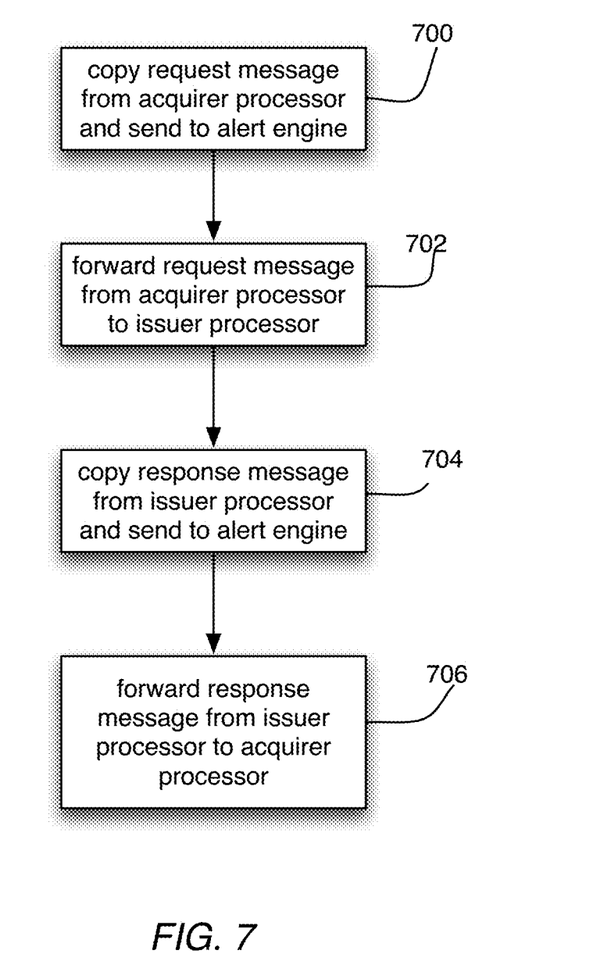
FIG. 7 shows the operations of a switch, in accordance with one embodiment of the invention.

Embodiments of the invention described herein disclose locating a network data element or switch inline between a card network and an issuer processor. In addition to a normal operation of forwarding packets between the card network and the issuer processor, the switch also forward copies of packets transmitted between the card network and the issuer processor an alert engine. Operations of the switch in accordance with one embodiment of the invention includes the following blocks (see FIG. 7):

Block 700 where a copy of each request message from the acquirer processor is sent to the alert engine;

Block 702 where each request message is forwarded from the acquirer processor to the issuer processor via the intermediate card network 204;

Block 704 where a copy of each response message from the issuer processor is send to the alert engine; and Block 706 where each response message is forwarded from the issuer processor to the acquirer processor.

Figure 8:
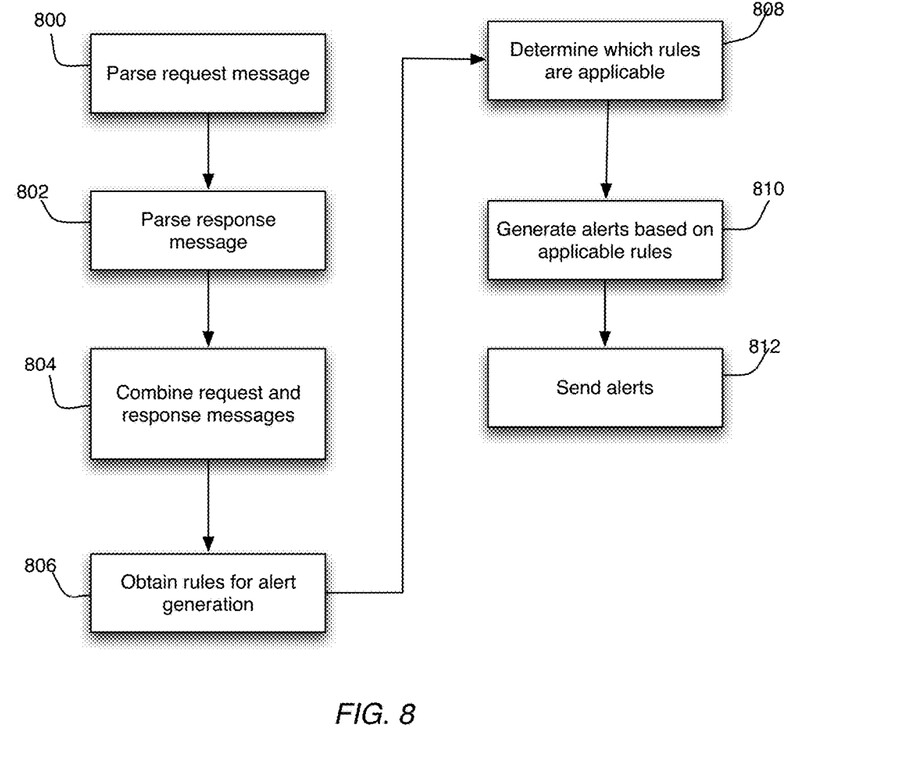
FIG. 8 shows the operations of an alert engine, in accordance with one embodiment of the invention.

To be sure, embodiments of the present invention described herein disclose an alert engine configured to be communicatively coupled with the aforesaid data element or switch. The alert engine may be implemented as a server and advantageously generates alerts to a card holder or a proxy for the card holder in accordance with policy set by the card holder. In accordance with one embodiment, the alert engine of the present invention may be operable to perform the operations shown in the flowchart of FIG. 8, which includes the following processing blocks:

Block 800 where each request message received from the data network element is parsed in order to reconstruct the transaction data, sometimes including but not restricted to, the card number, account number, merchant identifier, merchant type, merchant name, merchant location, transaction amount, transaction type, and transaction status;

Block 802 where each request message received from the data network element is likewise parsed in order to reconstruct the transaction data. Block 802 is optional and may not be executed in some embodiments;

Block 804 where the matching pairs of request and response messages are combined to provide complete transaction information corresponding to a transaction initiated by a card holder. The block 804 may be optional and thus not found in all embodiments;

Block 806 where the rules/policy set by a card holder for alerts are obtained;

Block 808 where a determination is made as to which rules are applicable to the particular transaction at hand. For example a "follow me" rule may specify that a transaction is to allowed only when it is determined that a card holder is physically located on the premises of a merchant who initiated the transaction request. Obviously, this rule cannot be satisfied in the case on an online purchase. Thus, the under block 808 this rule would be determined to be inapplicable for an online transaction;

Block 810 where alerts are generated for the card holder based on the applicable rules; and Block 812 where generated rules are send to card holder directly or indirectly by means of a proxy, as already described.

Figure 9:
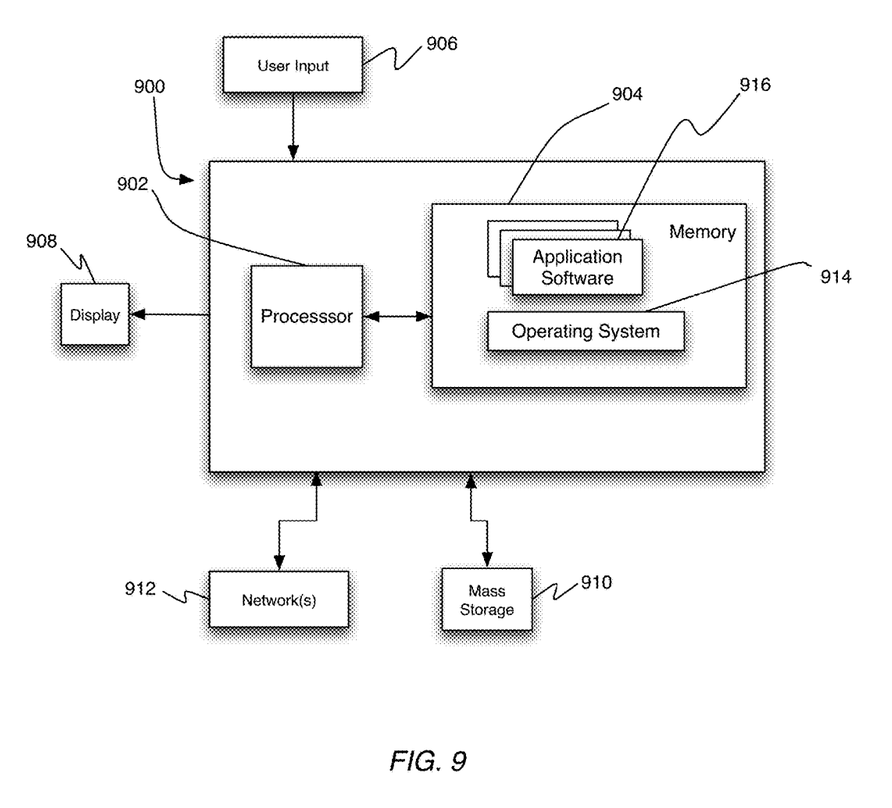
FIG. 9 shows an example of hardware that may be used to implement an alert engine, in accordance with one embodiment of the invention.

FIG. 9 shows an example of hardware 900 that may be used to implement the alert engine described herein. The hardware 900 typically includes at least one processor 902 coupled to a memory 904. The processor 902 may represent one or more processors (e.g., microprocessors), and the memory 904 may represent random access memory (RAM) devices comprising a main storage of the hardware 900, as well as any supplemental levels of memory e.g., cache memories, non-volatile or back-up memories (e.g. programmable or flash memories), read-only memories, etc. In addition, the memory 904 may be considered to include memory storage physically located elsewhere in the hardware 900, e.g. any cache memory in the processor 902, as well as any storage capacity used as a virtual memory, e.g., as stored on a mass storage device 910.

The hardware 900 also typically receives a number of inputs and outputs for communicating information externally. For interface with a user or operator, the hardware 900 may include one or more user input devices 906 (e.g., a keyboard, a mouse, a scanner etc.) and a display 908 (e.g., a Liquid Crystal Display (LCD) panel). For additional storage, the hardware 900 may also include one or more mass storage devices 910, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 900 may include an interface with one or more networks 912 (e.g., a local area network (LAN), a wide area network (WAN), a wireless network, and/or the Internet among others) to permit the communication of information with other computers coupled to the networks. It should be appreciated that the hardware 900 typically includes suitable analog and/or digital interfaces between the processor 902 and each of the components 904, 906, 908 and 912 as is well known in the art.

The hardware 900 operates under the control of an operating system 914, and executes various computer software applications, components, programs, objects, modules, etc. indicated collectively by reference numeral 916 to perform the techniques described above In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), flash drives among others.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method, in an alert server device passively disposed within a data communication network within datapath of a card network and an issuer processor, for reconstructing sniffed network traffic relating to payment card transactions that are separated across at least two messages and are transmitted from different sources and have different destinations on a data communication network, to generate alerts to users the during payment card transactions the method comprising:
 storing custom rules for user location, in a memory of the alert server device, provisioned by card holders and concerning payment card transactions;
 receiving, in a network interface of the alert server device, messages forwarded from network traffic at a layer 2 switch device between the card network and the issuer processor, wherein the layer 2 switch sniffs network traffic exchanged in both directions between the card network and the issuer processor, and wherein the network traffic pertains to payment card transactions in at least two of the messages at the layer 2 switch device during payment card transactions, one message comprising a transaction request sent from the issuer processor, and one message comprising a transaction response sent from the card network, and each payment card transaction associated with a payment card of a specific card holder;
 at least partially reconstructing elements of each payment card transaction, in a processor of the alert server device, based on correlating the transaction request message with the transaction response message of a payment card transaction in common by correlating at least a common card number parsed from a specific field of each of the at least two messages;
 identifying a specific payment card transaction from the payment card transactions by analyzing the at least partially reconstructed elements against a customized alert policy as provisioned by the specific card holder;
 responsive to the at least partially reconstructed elements being relevant to at least one rule of the specific customized preconfigured alert policy, generating an alert for the specific card holder associated with specific payment card transaction before the specific payment card transaction is completed, wherein the card network and the issuer processor are both unaware of, and are not part of the alert generation; and
 sending the alert to the specific card holder during the specific payment card transaction.

2. The method of claim 1, wherein the step of alert generation is responsive to follow me rule requiring the card holder to be present at the merchant location.

\* \* \* \* \*